United States Patent Office 3,230,594
Patented Jan. 25, 1966

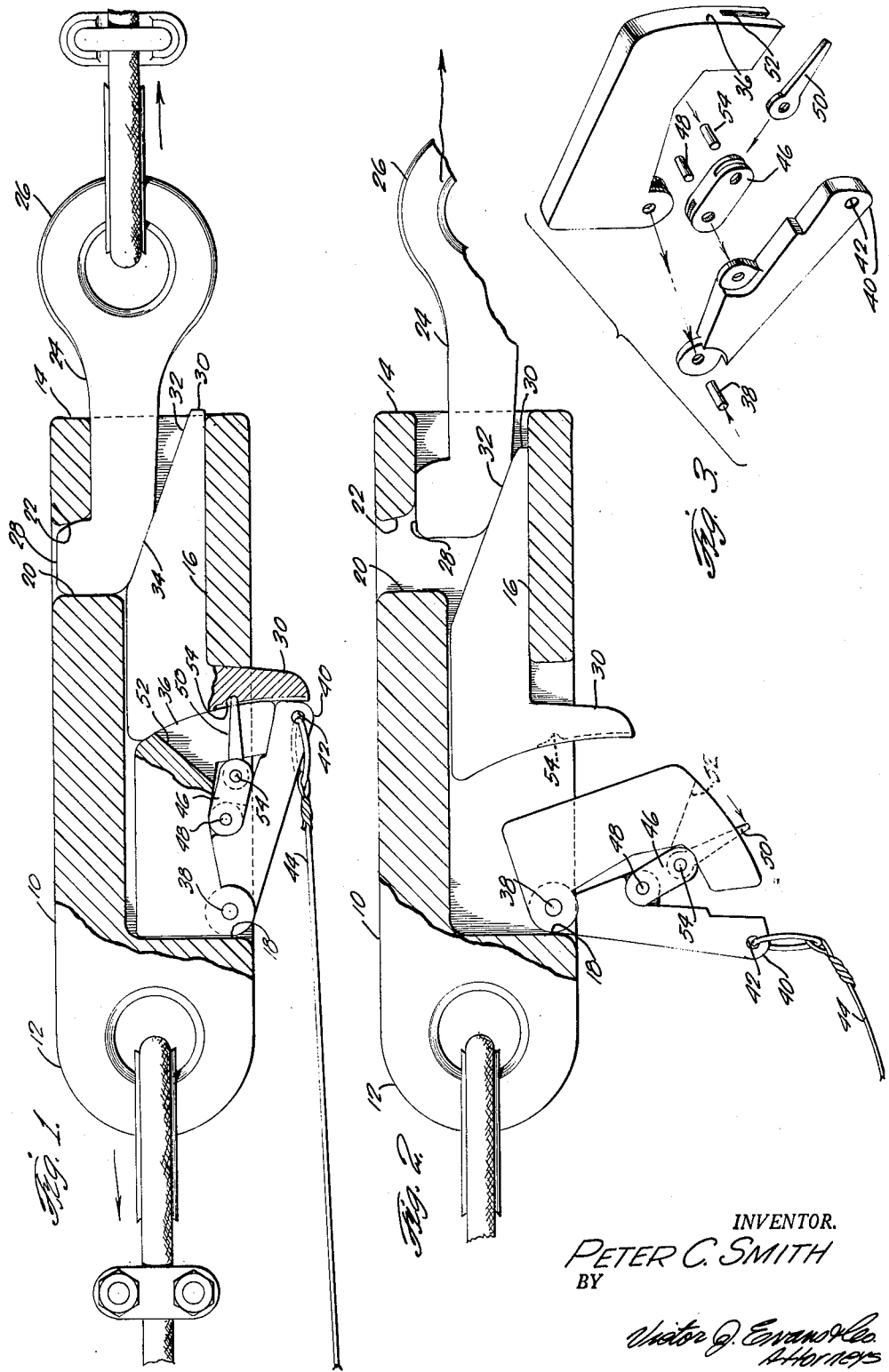

3,230,594
FULL TENSION UNLOCKING COUPLING
Peter C. Smith, 869 Amboy Ave., Perth Amboy, N.J.
Filed Apr. 1, 1964, Ser. No. 356,387
5 Claims. (Cl. 24—230)

This invention relates generally to coupling members and more particularly to an unlocking coupling member which will uncouple or unload while under full tension or load.

Coupling members of the type which include unlocking mechanisms under full tension loads thereon are old in the art per se. However, such coupling structures, Although serving a very useful purpose, have heretofore proven inadequate in many respects. The primary disadvantage inherent in prior known coupling structures, however, is that of requiring excessive forces to unlock the mechanisms. This disadvantage is inherent in these prior structures due to the fact that the actual unlocking mechanism provides the bias between the hook and the lock housing. When tension is applied between the ends of the device, tremendous forces are exerted on the locking structures. When such structures are to be moved for removing the locking bias, sufficient force must be exerted to overcome the forces provided by the load on the device. Prior structures were provided with wedging members for retaining the hook member into an opening provided in the member. It can be seen that under full load, these wedges would be difficult to remove.

It is, therefore, a primary object of this invention to provide a coupling member which allows ease of unlocking, from a remote point.

It is another object of this invention to provide a coupling member which provides positive locking action during all periods of draft action.

Another object of this invention is to provide a coupling member which increases the locking biases in response to increased loads thereon.

Still another object of this invention is to provide a coupling member which allows unlocking under full load quickly and easily when the locking mechanisms are actuated, and without slack or reversal in the line of draft.

Yet another object of this invention is to provide a coupling member which does not "hang up" when unlocking mechanisms is actuated in that draft action progressively uncouples the component parts of the lock.

These and other objects of the present invention will be more fully realized and understood from the following detailed description when taken in conjunction with the accompanying drawing wherein:

FIGURE 1 is a side elevational partially in section illustrating the respective elements in their locked position;

FIGURE 2 is a side view similar to FIGURE 1, but illustrating the elements in their unlocked position; and FIGURE 3 is an exploded view of the trigger mechanism of the coupling.

Like reference numerals throughout the various views of the drawing are intended to designate the same or similar structures.

With reference to the drawing, and in particular to FIGURE 1, there is shown the preferred form of the invention with the elements illustrated in locked position. A lock and trigger housing 10 includes an eye 12 at one end thereof and an open end 14. A slot 16 extends inwardly of the housing from the open end thereof and terminates in an opening 18 for receiving the trigger mechanism. An opening 20 extends from one side of the housing into the slot and includes a cam surface 22 therein.

A hook member 24 includes an eye 26 at one end thereof and a hook 28 at the other end thereof. Hook 28 is disposed for being received in opening 20 and engaging surface 22 therein.

A wedge 30 is disposed within slot 16 and includes a cam surface 32. Hook 24 similarly includes a cam surface 34 thereon which is engaged by surface 32 for retaining hook 28 within opening 20. The wedge is disposed for sliding movement within the slot along the longitudinal axis of the housing, and in the position shown in FIGURE 1, it maintains a locked position between the hook and the housing.

A lock member 36 is pivotally mounted in the slot by means of a pin 38 and is disposed for restricting the longitudinal movement of wedge 30. Also pivotally mounted in the slot by means of pin 38 is a trigger 40 having a hole 42 therein for receiving a wire 44 or similar structure for actuation thereof.

A link 46 is pivotally mounted at one end thereof to trigger 40 by means of a pin 48. A plunger 50 is pivotally mounted to the other end of link 46 and extends through a slot 52 in lock 36 and engages a notch 54 in wedge 30. Plunger 50 is pivotally connected to the link by means of a pin 54 therethrough.

The position of the elements as shown in FIGURE 1, provide a locking bias to retain hook 28 within opening 20. This is provided by link 46 being angularly disposed with respect to a longitudinal axis through the housing and when a force is exerted through wedge 30 and plunger 50 to the link, it tends to pivot the trigger mechanism into the slot. This pivotal engagement retains the lock member within the slot abutting against the wedge member and retaining it from longitudinal movement therein. However, when trigger 40 is pivoted downwardly, pivot pin 48 is also carried downwardly and as it passes the dead center with pin 54, the entire mechanism releases and lock member 36 drops out of the path of the longitudinal movement of wedge 30. It can be seen that an effective lock is provided by the elements due to the link member being angularly disposed with respect to the longitudinal axis. That is, wedge 30 provides a force on plunger 50 along the longitudinal axis which tends to pivot link 46 in a clockwise direction thus locking the elements together.

When the trigger is actuated by wire 44, the link and plunger disengage the wedge and allow it to move longitudinally. Hook 28 having a tension thereon in the direction of the arrows cams against a surface 22 and surface 32 and moves the wedge to the left as shown in the drawing. This longitudinal movement of the wedge cams the lock member downwardly and out of its path and allows the hook member to remove itself from the open end of the housing.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:

1. A coupling comprising a housing having an open end and an opening disposed in one side thereof and extending to the open end, a hook member including an eye at one end thereof disposed for being received in the open end and for engaging in the opening, said housing including a slot extending from the open end and terminating at one side thereof, a wedge disposed in said slot and disposed for retaining said hook member in the opening, said wedge being disposed for longitudinal movement within the slot, a lock member pivotally mounted in the slot and disposed for engaging said wedge and restricting the longitudinal movement thereof, a trigger pivotally mounted in said slot, a link pivotally connected at one end thereof to said trigger, a plunger pivotally connected at the other end of said link, said plunger disposed for engaging said wedge.

2. A coupling comprising a housing having a slot terminating in an open end thereof and extending along a longitudinal axis thereof, said housing including an opening in one side thereof extending into the slot, a hook member including an eye at one end thereof disposed for being received through the open end into the opening, a wedge disposed in said slot and disposed for retaining said hook member in the opening, said wedge disposed for longitudinal movement along the longitudinal axis, a lock member pivotally mounted in said slot and disposed for restricting the longitudinal movement of said wedge, a trigger pivotally mounted in said slot, a link pivotally mounted at one end thereof to said trigger, a plunger pivotally mounted to the other end of said link and disposed for engaging said wedge, said link being disposed for movement to one position of being angularly disposed with respect to the longitudinal axis, the longitudinal movement of said wedge providing rotational movement to said link when in the one position to effect biasing of said lock member into said slot.

3. A coupling comprising a housing having a slot terminating in an open end and extending along a longitudinal axis thereof, said housing including an opening in one side thereof extending into the slot, a hook member disposed for being received through the open end into the opening, means for wedging said hook member into the opening and disposed for longitudinal movement in the slot to release said hook member from said opening, a lock member mounted in said slot and disposed for restricting the longitudinal movement of said wedging means, and means for locking said lock member in said slot.

4. A coupling comprising a housing having a slot terminating in an open end and extending along a longitudinal axis thereof, said housing including an opening in one side thereof extending into the slot, a hook member disposed for being received through the open end into the opening, means for wedging said hook member into the opening and disposed for longitudinal movement in the slot to release said hook member from said opening, a lock member pivotally mounted in said slot and disposed for movement into the path of the longitudinal movement of said wedging means, and means for locking said lock member in said slot.

5. The coupling of claim 4 wherein said locking means includes a trigger pivotally mounted at the pivotal mounting of said lock member, a link pivotally mounted at one end thereof to said trigger, and a plunger pivotally mounted on the other end of said link, said link being disposed for movement between a locking position and an unlocking position, said plunger engaging said wedging means for biasing said link to the locking position.

References Cited by the Examiner

UNITED STATES PATENTS 2,988,797 6/1961 Gaylord.
3,149,807 9/1964 Jungersen.

FOREIGN PATENTS 434,335 8/1935 Great Britain.

WILLIAM FELDMAN, *Primary Examiner.*